United States Patent Office 2,759,162
Patented Aug. 14, 1956

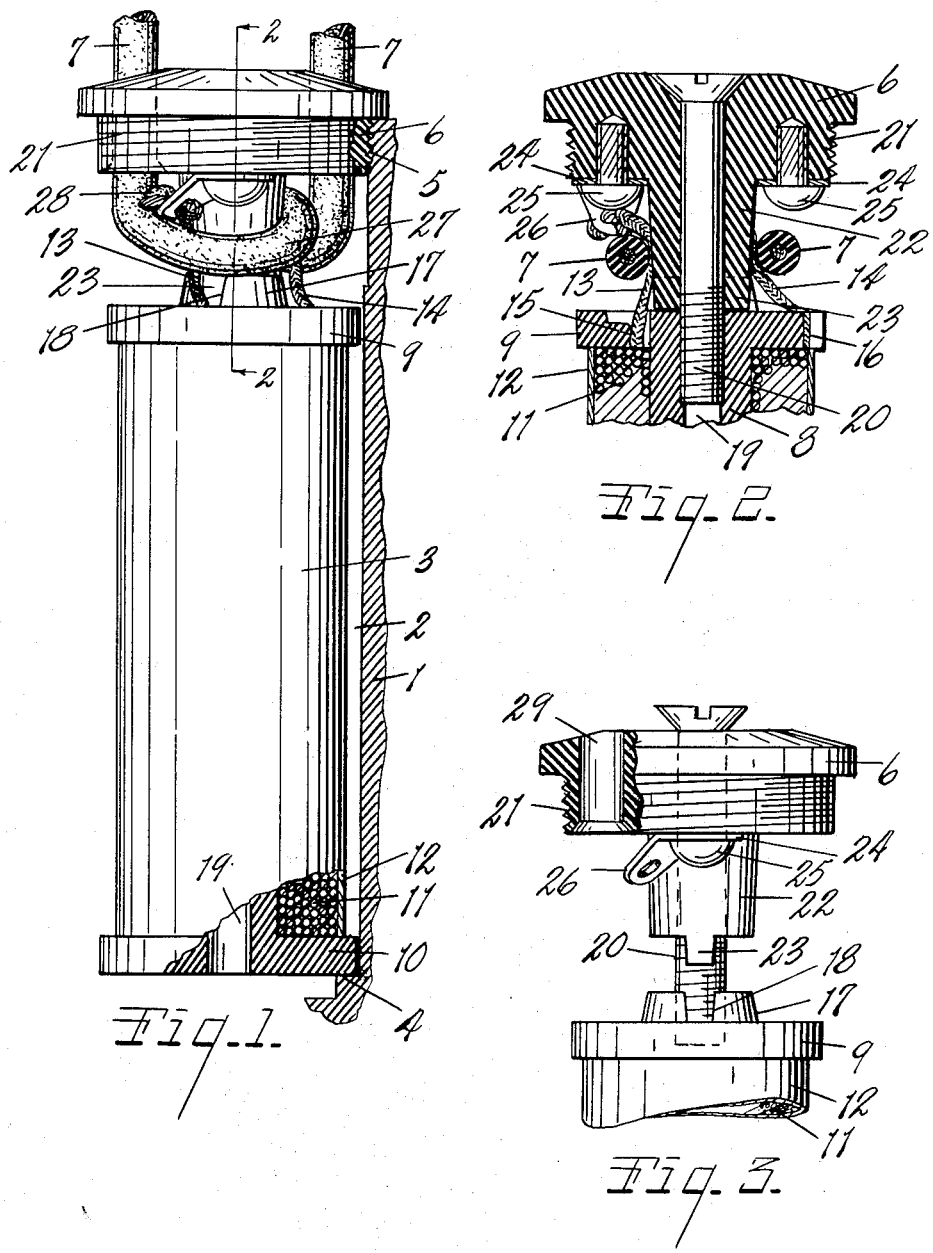

2,759,162

SOLENOID CORE AND TERMINAL CAP ASSEMBLY FOR ELECTRICAL TESTING INSTRUMENT

Leon L. Simkins, Kalamazoo, Mich., assignor, by mesne assignments, to Square D Company, Detroit, Mich., a corporation of Michigan Application November 28, 1951, Serial No. 258,715

4 Claims. (Cl. 339—105)

This invention relates to improvements in a solenoid core and terminal cap assembly for electrical testing instrument.

The principal objects of this invention are:

First, to provide a novel type of core and terminal cap assembly which permits the ends of a solenoid coil to be easily connected mechanically and electrically to terminals and lead wires mounted on the closure cap of an electrical testing instrument.

Second, to provide a core and end cap assembly which automatically orients terminal connections on the end cap with the ends of the coil wound on the core.

Third, to provide a core and end cap assembly that permits economical molding of the core from relatively expensive shock resistant plastic material and separate molding of the end cap from less expensive insulating materials.

Fourth, to provide a core and end cap assembly which is easily assembled and which may be then mounted in the case of an electrical testing instrument as a unit or subassembly.

Other objects and advantages relating to details and economies of my invention will be apparent from a consideration of the following description and claims. The drawings, of which there is one sheet, illustrate a highly practical commercial embodiment of my invention.

Fig. 1 is an elevational view of the coil, core and end cap assembly with a portion of the core and coil broken away in cross section and with a portion of the instrument case in which the assembly is adapted to be mounted shown in cross section.

Fig. 2 is a fragmentary longitudinal cross sectional view through the core and end cap taken along the plane of the line 2—2 in Fig. 1.

Fig. 3 is an enlarged elevational view of the core and end cap in partially assembled position.

My core and end cap assembly is designed primarily for use in electrical testing instruments in which the magnetic pull or attraction of an electrical coil exerts a force on a spring pressed armature proportional to the voltage applied to the coil. The armature, which has a pointer attached thereto, therefore moves a distance proportional to the voltage applied to the coil and the pointer is associated with a calibrated scale to indicate the applied voltage. The elements of the instrument are mounted in a convenient body or case and, as stated in the objects, my invention lies in the formation of the solenoid core and end cap which permits the parts to be easily assembled in the case.

In Fig. 1 I have illustrated a portion of the case 1 of the instrument. The case forms a cylindrical recess 2 adapted to receive the solenoid 3 with the inner end of the solenoid seated against an inner shoulder or end 4 of the recess. The outer end of the recess is threaded, as at 5, to engage the threaded end cap 6 for retaining the solenoid within the case. Rubber covered or otherwise insulated lead wires 7 for connecting the instrument to a circuit to be tested extend axially through holes provided therefor in the end cap 6.

The solenoid 3 consists of an inner tubular core 8 with integral circular end flanges 9 and 10. A coil of fine copper wire 11 is wound around the core between the end flanges and desirably covered by a protective wrapping 12. The electrical ends 13 and 14 of the coil 11 are led upwardly through the top end flange 9 through a hole 15 molded near the center of the upper end flange and a notch 16 molded in the periphery of the upper end flange. Since the coil of copper wire 11 is relatively heavy, the core 8 and end flanges 9 and 10 are subjected to considerable shock when the instrument is dropped or handled roughly and I prefer to mold the core and end flanges from a thermosetting phenolic resin having a cotton flock and synthetic rubber content. Actually the cotton flock and finely divided synthetic rubber form the mass of the molded body with the resin acting as a binder for the filler. Molded structures of this kind are relatively more expensive than molded resin bodies but are more resistant to shock, due to the rubber content in the body.

The upper end of the core 8 and the upper end flange 9 are provided with an integral upstanding neck 17 that is transversely or diametrically slotted as at 18. The neck 17 and the tubular core 8 form a single continuous bore 19 adapted at its lower end to receive the armature of the instrument described above but not illustrated. The upper end of the bore 19 is threaded to receive the screw 20.

The end cap 6 is a circular molded article formed of thermosetting plastic or other electrically insulating material that need not be as resistant to shock as the material of the core. The cap 6 includes a threaded portion 21 engageable with the threads 5 in the case and a depending neck 22 having a tongue 23 on its lower end engageable in the slot 18 in the neck of the core. The end cap 6 and its neck 22 form a central passage through which the screw 20 extends. The inner end face of the body of the cap 6 is provided with a pair of terminal clips 24 secured to diametrically opposite sides of the cap by drivescrews 25. The terminal clips 24 have apertured ears 26 through which the bared ends of the lead wires 7 and the ends 13 and 14 of the coil 11 are passed and twisted together to electrically connect and anchor the wires. Desirably the rubber covered end of one lead wire is wrapped around the neck 22 from its mounting terminal, as at 27 in Fig. 1, and around the insulated end of the other lead wire, as at 28, so that each lead wire clamps the other in place to prevent the lead wires from being torn loose from the terminal clips.

The separate molding of the core 8 and end cap 6 permits economical formation of the hole 15 and notch 16 for the ends of the coil 11 and also permits easy mounting of the terminal clips 24 and drivescrews 25 on the end cap. It is pointed out that holes for the reception of the drivescrews are molded in the end cap when it is formed. Holes are also molded through the end cap, as at 29, for passing the lead wires 7. The bared ends of the lead wires and the coil are easily connected through the ears of the terminal clips and soldered together after which the insulated portions of the lead wires are drawn snug about each other as previously described. The finished assembly is highly resistant to shock and easily mounted in the case 1. The above described example of my core and end cap assembly is intended only to show a practical embodiment of my invention but not as a limitation of my invention as various modifications of the assembly to adapt it to different circumstances will be readily apparent.

Having thus described my invention, what I claim as new and desire to secure by Letters Patent is:

1. A solenoid coil core and end cap assembly for an electrical testing instrument comprising, a tubular core having integral end flanges molded from a thermosetting plastic material having a synthetic rubber filler, one end flange having a hole and peripheral notch formed therethrough for passage of the ends of the coil to be wound around the core, said one end flange having an upstanding central neck integrally formed thereon and transversely slotted, an end cap of different molded material having a circular threaded body portion and a depending central neck, said depending neck having a tongue on the lower end engageable in the slot in said neck on said flange, a screw extending through said cap and engaged in said core, and terminal clips secured to the inner side of said end cap by drivescrews driven into holes formed in the end cap on opposite sides of the neck thereof, said end cap further having holes formed therethrough at angularly displaced positions from said drivescrews for the reception of insulated lead wires adapted to have their bared inner ends connected to said terminal clips and to the ends of a coil wound on said core.

2. A solenoid coil core and end cap assembly for an electrical testing instrument comprising, a tubular core having integral end flanges molded from a thermosetting plastic material having a synthetic rubber filler, one end flange having a hole and peripheral notch formed therethrough for passage of the ends of the coil to be wound around the core, said one end flange having an upstanding central neck integrally formed thereon and transversely slotted, an end cap of different molded material having a circular threaded body portion and a depending central neck, said depending neck having a tongue on the lower end engageable in the slot in said neck on said flange, a screw extending through said cap and engaged in said core, and terminal clips secured to the inner side of said end cap by drivescrews driven into holes formed in the end cap on opposite sides of the neck thereof.

3. A solenoid coil core and end cap assembly for an electrical testing instrument comprising, a tubular core having integral end flanges molded from a first thermosetting plastic material, one end flange having a hole and peripheral notch formed therethrough for passage of the ends of the coil wound around the core, said one end flange having an upstanding central neck integrally formed thereon and transversely slotted, an end cap molded of a second plastic material and having a circular threaded body portion and a depending central neck, said depending neck having a tongue on the lower end engageable in the slot in said neck on said flange, a screw extending through said cap and engaged in said core, and terminal clips secured to the inner side of said end cap on opposite sides of the neck thereof, said end cap further having holes formed therethrough at angularly displaced positions from said clips for the reception of insulated lead wires.

4. A solenoid coil core and end cap assembly for an electrical testing instrument comprising, a tubular core having integral end flanges molded from a first thermosetting plastic material, one end flange having a hole and peripheral notch formed therethrough for passage of the ends of the coil wound around the core, said one end flange having an upstanding central neck integrally formed thereon and transversely slotted, an end cap molded of a second plastic material and having a circular threaded body portion and a depending central neck, said depending neck having a tongue on the lower end engageable in the slot in said neck on said flange, a screw extending through said cap and engaged in said core, and terminal clips secured to the inner side of said end cap on opposite sides of the neck thereof.

References Cited in the file of this patent

UNITED STATES PATENTS

| Number | Name | Date |
|---|---|---|
| 840,531 | Walsh | Jan. 8, 1907 |
| 1,014,780 | Smith | Jan. 16, 1912 |
| 1,346,525 | Beetem | July 13, 1920 |
| 1,710,862 | Chryst | Apr. 30, 1929 |
| 1,997,198 | Ogg | Apr. 9, 1935 |
| 2,443,545 | Schwennesen | June 15, 1948 |
| 2,538,020 | Lomholt | Jan. 16, 1951 |

FOREIGN PATENTS

| 12,177 | Great Britain | May 20, 1912 |